United States Patent [19]

Wagner

[11] Patent Number: 4,736,150
[45] Date of Patent: Apr. 5, 1988

[54] METHOD OF INCREASING THE USEFUL LIFE OF RECHARGEABLE LITHIUM BATTERIES

[75] Inventor: Otto C. Wagner, Long Branch, N.J.

[73] Assignee: The United States of America as represented by the Secretary of the Army, Washington, D.C.

[21] Appl. No.: 887,142

[22] Filed: Jul. 9, 1986

[51] Int. Cl.$^4$ ................................ H02J 7/00
[52] U.S. Cl. ............................ 320/21; 320/2
[58] Field of Search .................... 320/2, 3, 4, 21

[56] References Cited

U.S. PATENT DOCUMENTS 3,556,849  1/1971  Oswin et al. .................... 320/21
3,563,800  2/1971  Oswin et al. .................... 320/21
4,550,064 10/1985  Yen et al. ...................... 429/194

Primary Examiner—Patrick R. Salce
Assistant Examiner—Anita M. Ault
Attorney, Agent, or Firm—Sheldon Kanars; Jeremiah G. Murray; Roy E. Gordon

[57] ABSTRACT

The cycle life of rechargeable lithium batteries is significantly prolonged by applying to the battery as a charging mode a current interrupted at intervals of 1 milliseconds to 9 seconds in a frequency range of about 0.1 to about 10 Hertz.

11 Claims, 5 Drawing Sheets

METHOD OF INCREASING THE USEFUL LIFE OF RECHARGEABLE LITHIUM BATTERIES

The invention described herein may be manufactured, used and licensed by or for the Government for governmental purposes without the payment to me of any royalty thereon.

This invention relates in general to a method of increasing the useful life of rechargeable lithium batteries and in particular to such a method wherein an interrupted current is applied as charging mode to the battery.

BACKGROUND OF THE INVENTION

Heretofore, a standard DC charging mode has been used as the charging mode for rechargeable lithium batteries. The difficulty with such a charging mode has been the high drop in capacity and shortened cycle life due to internal shorting by lithium penetration through the separator.

SUMMARY OF THE INVENTION

The general object of this invention is to provide a method of increasing the useful life of reachargeable lithium batteries. A more particular object of the invention is to provide such a method that prolongs the cycle life of rechargeable lithium batteries.

It has now been found that the aforementioned objects can be attained by replacing the standard DC charging mode with an interrupted current (IC) in a frequency range of 0.1 to 10 Hertz.

For example, at the 12 hour rate of charge, 2 ampere-hour (Ah) lithium molybdenum disulfide (Li/MoS$_2$) cells deliver 100 cycles (charges plus discharges) on the standard DC charging mode to a 40 percent decrease from initial capacity. On a 5 Hertz (Hz) IC charging mode at a 50 percent duty cycle (50 percent on and 50 percent off), the cycle life is extended to 150 cycles. At a 2 Hz, 50 percent duty cycle, the life is further extended to 225 cycles.

For the 2 Ah lithium-titanium disulfide 3-cell batteries, 78 cycles are attained on the DC mode to a 40 percent drop in capacity. On 5 Hz, 50 percent duty cycle IC mode, only 82 cycles are obtained, but on the 2 Hz (50 percent duty cycle) mode, the life is extended to 130 cycles. The beneficial effect of the IC charging mode is due to the improved efficiency of replating lithium ions from the electrolyte onto the anode surface, as well as providing a more active surface morphology of the anode.

EXAMPLE 1

Figure 1:
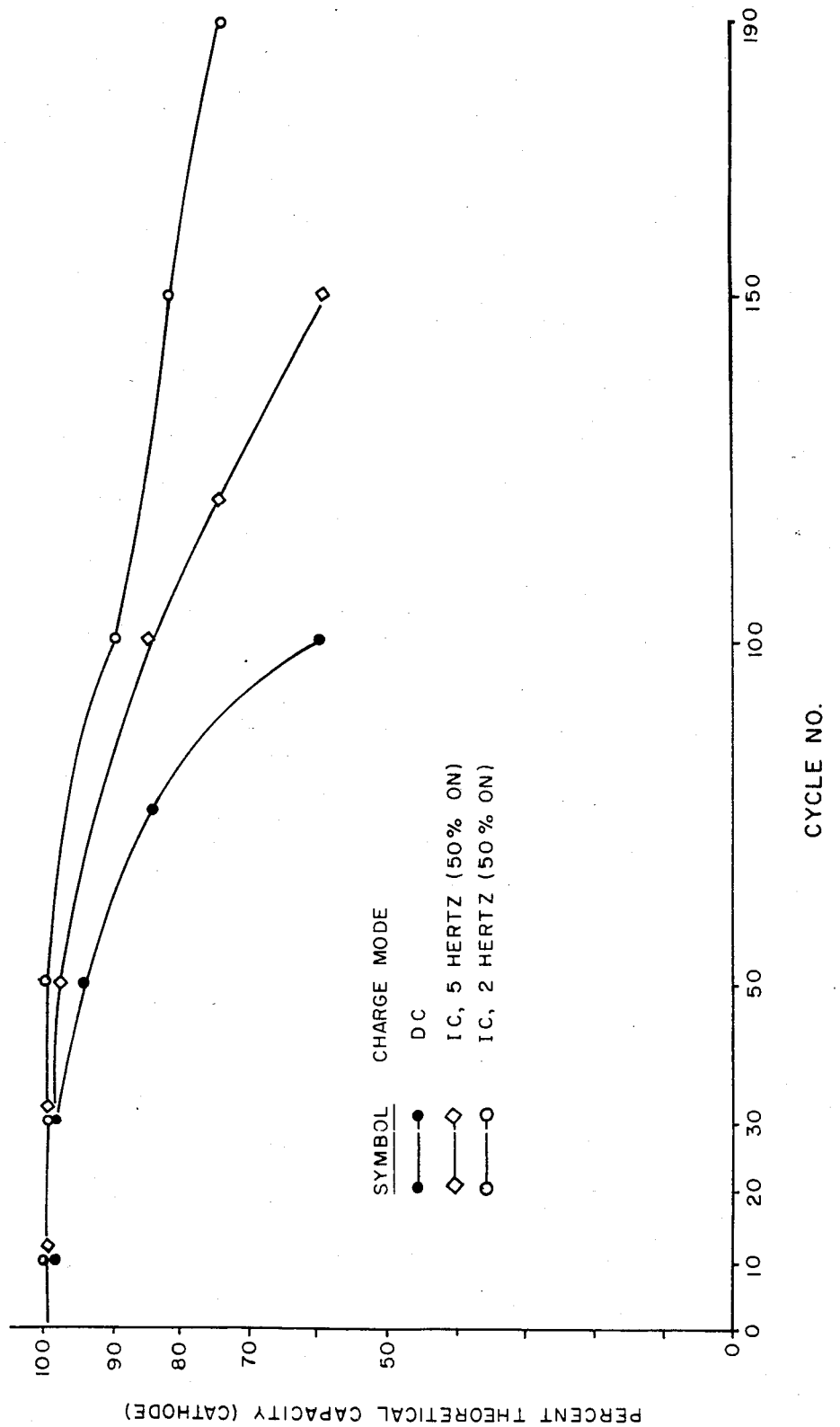
FIG. 1 shows the capacity maintenance curves of 2 (Ah) (Li/MoS$_2$) C-sized cells subjected to various modes of charge.

FIG. 1 shows the capacity maintenance curves of 2 ampere-hour (Ah) lithium-molybdenum disulfide (Li/MoS$_2$) c-sized cells subject to various modes of charge. The cells are charged at an average current of 200 milliamperes (mA) to a voltage cutoff of 2.60 volts per cell and discharged at 400 mA to 1.10 volts per cell. All cycling (charges and discharges) are at room temperature ambient. Cycling is terminated when the cells lose 40 percent of their initial capacity or when a cell develops an internal short by lithium penetration through the separator.

It can be seen from FIG. 1 that the standard DC cycled cells (two cells per variation) deliver approximately 100 cycles. The cells cycled by an IC charger at 5 Hertz frequency and 50 percent duty cycle (100 milliseconds pulse, 100 milliseconds rest) extend the useful life to 150 cycles. Finally, at 2 Hertz IC charge (50 percent duty cycle) the battery/cell life is further extended to 225 cycles - only 190 cycles being shown in the figure to a 25 percent drop in capacity.

EXAMPLE 2

Figure 2:
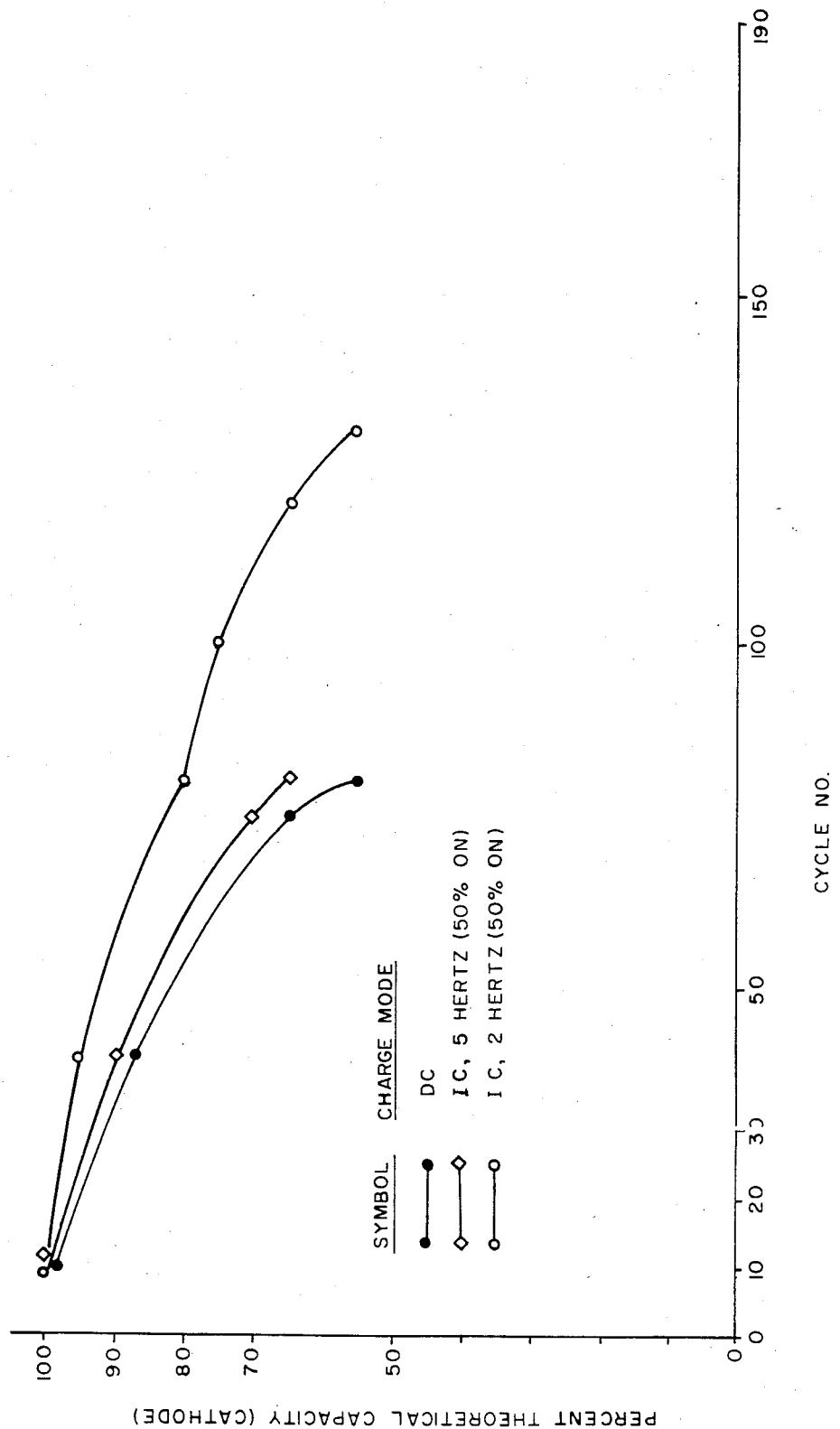
FIG. 2 shows the capacity maintenance curves of 2 (Ah) prismatic (Li/TiS$_2$) 3-cell batteries subjected to the same charging modes as in FIG. 1.

FIG. 2 shows the capacity maintenance curves of 2 Ahr prismatic lithium - titanium disulfide (Li/TiS$_2$) 3-cell batteries subjected to the same charging modes as in Example 1. The batteries are charged at an average current of 200 mA to a voltage cut off of 7.65 volts <2.55 volts per cell and discharged at 400 mA to 5.25 volts <1.75 volts per cell. All cycling is at room temperature ambient and the failure criteria are the same as Example 1.

It can be seen from FIG. 2 that the DC cycled battery delivers 78 cycles. The battery cycled at 5 Hertz (50 percent duty cycle) was not significantly better at 82 cycles. However, the battery cycled at 2 Hertz (50 percent duty cycle) exhibited an extremely useful life of 130 cycles. The differences in the performances of the two systems in examples 1 and 2 are attributed to the differences in the chemistry of the electrolyte and cathodes. Both systems employ lithium hexafluoroarsenate as the lithium salt but the organic solvents plus additives differ: ring-type ethers in the Li/TiS$_2$ system and propylene carbonate plus dimethoxyethane in the Li/MoS$_2$ systems.

Figure 3:
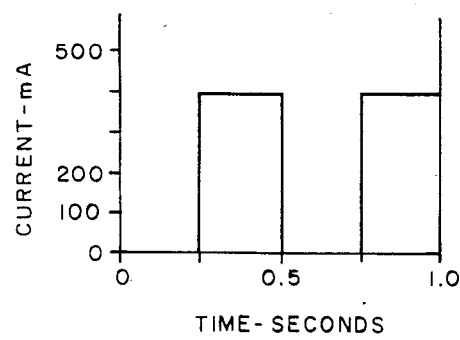
FIGS. 3 to 6 show the waveforms of various embodiments of the IC charge versus that of DC (FIG. 4).
Figure 4:
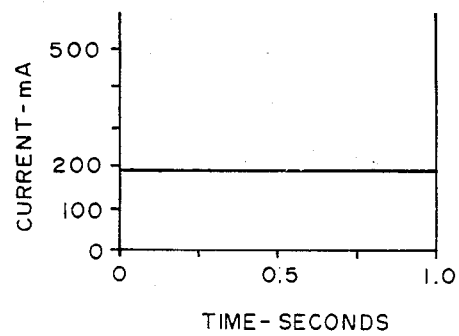

Referring to FIGS. 3 to 6, there is shown the waveforms of various embodiments of the IC charge mode versus that of DC (FIG. 4). The abscissas designate time in seconds and the ordinates designate the charging current in milliamperes. The 2 Hertz, 50 percent duty cycle is employed in FIGS. 3, 5, and 6.

Figure 5:
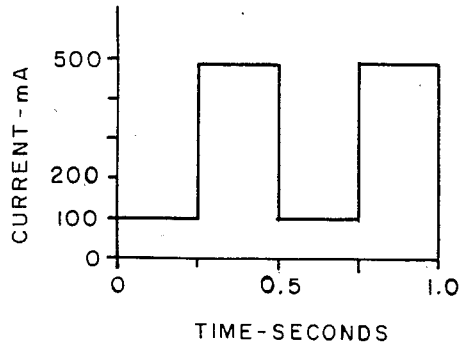

FIG. 3 shows the 2 Hertz waveform used for examples 1 and 2. The DC charge (FIG. 4) is steady at 200 mA, while the IC waveform is at rest for 250 milliseconds (ms) and then peaks at 400 mA for 250 ms to complete the waveform cycle. The IC current averages to 200 mA to yield the same effective current as the DC charge. It is noted that the IC waveform is square-waved; a sinusoidal waveform with the same rest and pulse intervals is equally beneficial to the rechargeable lithium battery. A variation, shown in FIG. 5 is also effective in extending the useful life of the lithium battery; i.e. when the IC waveform is superimposed on a DC current. In the example shown in FIG. 5, the average current is 300 mA; the DC current is 100 mA and the IC peak current is 500 mA.

Figure 6:
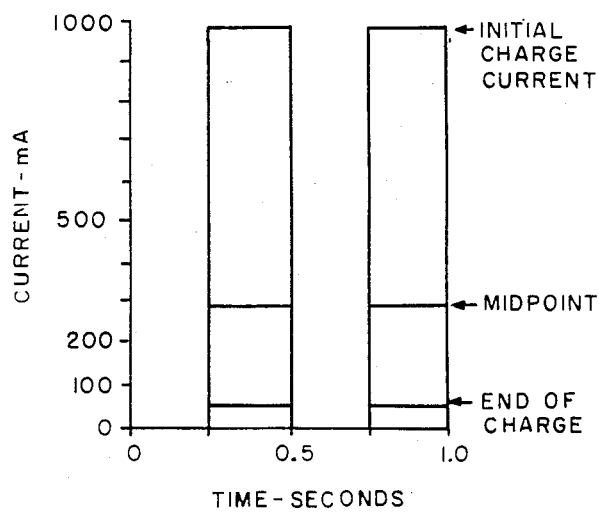

FIG. 6 shows the most preferred embodiment in which the IC mode is superimposed on a constant potential (CP) charger with a limiting initial current. CP chargers are widely used in cars, trucks, ships, aircraft and the like. The desired features of the CP charger are (a) the high initial current (limited to a safe maximum value) significantly reduces the charging time, (b) the CP is set to the safe upper voltage limit of the battery to prevent oxidation of the cathode and/or electrolyte and (c) as the battery EMF rises and approaches the CP limit, the current gradually reduces to a safe level, low enough to prevent lithium penetration shorts although no lithium penetration symptoms were detected during the evaluation of the constant current IC charging mode.

Figure 7A:
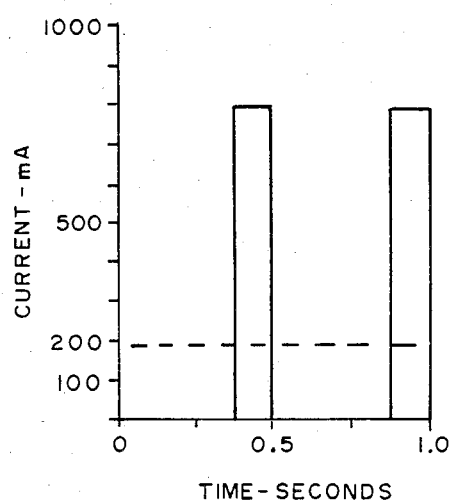
FIG. 7a shows how the pulse duty cycle can be varied.
Figure 7B:
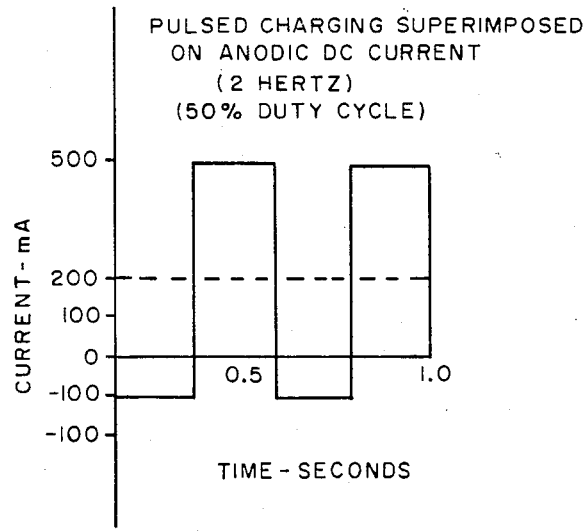
FIGS. 7b & 7c show the combining of anodic pulses with cathodic charging pulses.
Figure 7C:
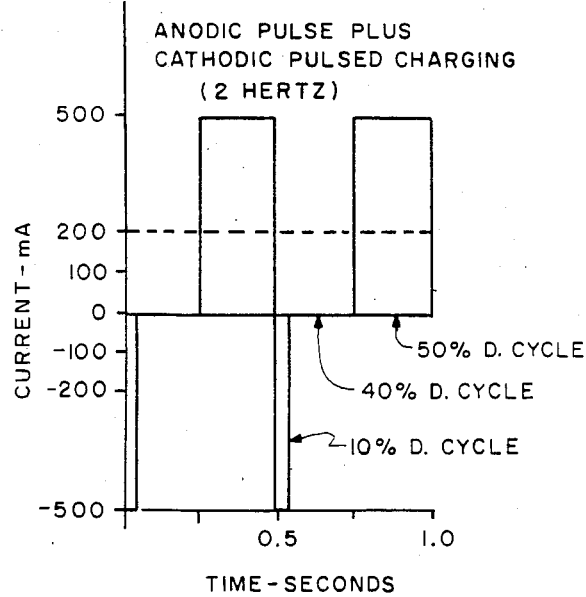

Further embodiments and variations of the invention are shown in FIGS. 7a, 7b, and 7c. As shown in FIG. 7a, the pulse duty cycle can vary from a fraction of a millisecond to many seconds — 10 seconds being a practical upper limit at 0.1 Hertz frequency. FIG. 7a illustrates a 2 Hertz waveform with a 25 percent duty cycle, each pulse having an interval of 125 ms and an amplitude of 800 mA (rest interval being 375 ms) to maintain an average current of 200 mA. (dashed line). The disadvantage of high amplitude pulses are: (a) high current densities above 10 mA/cm$^2$ will disrupt the reversible lithium plating condition, even though the resulting longer rest intervals have a compensating effect, (b) the charging interrupter becomes more intricate and expensive as the simplest device is one with a 50 percent on — 50 percent off combination and (c) the resulting higher voltages from the high peak currents generate considerable heat in the battery and charger which must be dissipated which is another added expense.

FIGS. 7b and 7c show the embodiments of combining anodic pulses with cathodic charging pulses, a flat anodic DC current in the case of FIG. 7b and a high peaked anodic current in FIG. 7c. The advantage of anodic pulses is that they break down and prevent any possible lithium penetration fronts. Their effectiveness in the 0.1 to 10 Hertz cathode pulse frequency range is between 5 percent and 50 percent of the duty cycle.

Figure 8:
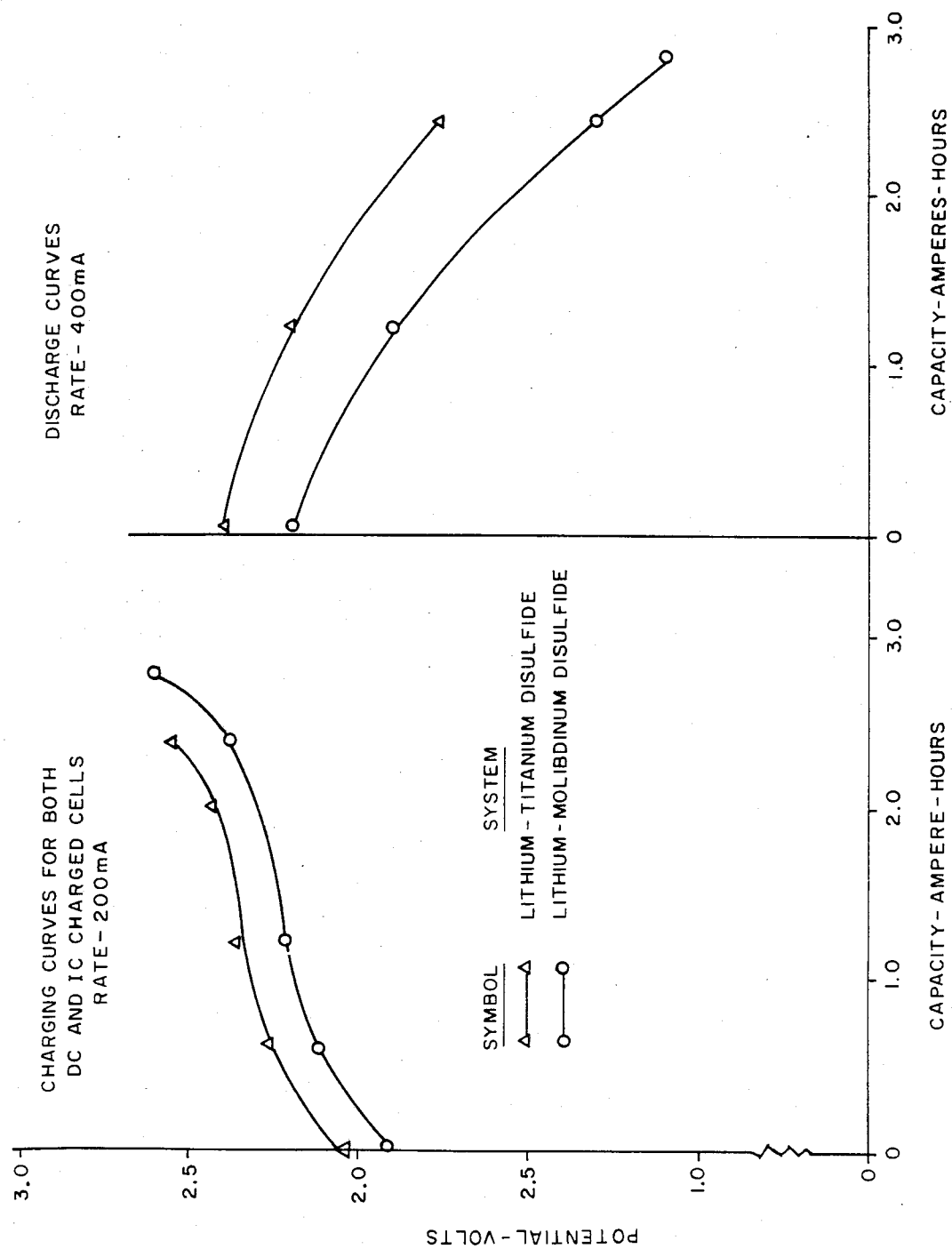
FIG. 8 shows the charge/discharge curves of the Li/MoS$_2$ and Li/TiS$_2$ unit cells when charged and discharged at the rates used in examples 1 and 2.

FIG. 8 shows the charge/discharge curves of the Li/MoS$_2$ and Li/TiS$_2$ unit cells when charged and discharged at the rates used in examples 1 and 2. The charge curves are virtually the same for the DC and IC modes and are identical on discharge. However, on close examination with a sensitive digital volt meter or oscilloscope, it is noted that the IC charging curve exhibits a small ripple of ± several millivolts depending on the charge current, while the DC curve is flat. IC is also identified by the oscillating motion of the ammeter on the charger.

Thus, it has been found that IC charging significantly prolongs the useful life of the rechargeable lithium batteries via a lithium ion transport process and uniform lithium replating on the anodes. The optimum frequency range of the IC charging mode is between 0.10 Hertz and 10 Hertz, depending on the electrolyte and cathode compositions, the charging rate and temperature. IC charging, particularly with superimposed anodic pulses, arrests the rate of lithium metal penetration through the separator which is the primary failure mode of rechargeable lithium batteries.

It is noted that pulse charging has been applied in the past to other electrochemical systems as for example, the alkaline-zinc, and alkaline-silver systems. However, the pulse frequency is solely dependent on the anode/electrolyte chemistry. For example, 5 Hertz is optimum in the nickel-zinc electrochemical system but fails in the case of the lithium-titanum disulfide system as seen in example 2 of FIG. 2 of this application. It is necessary to reduce the frequency to 2 Hertz before any beneficial effect can be obtained with the Li/TiS$_2$ system. In other words, the optimum pulse frequency of the rechargeable lithium system is significantly lower than that of the alkaline-zinc batteries.

I wish it to be understood that I do not desire to be limited to the exact details of construction as described for obvious modification will occur to a person skilled in the art.

What is claimed is:

1. Method of significantly prolonging the cycle life of rechargeable lithium batteries comprising applying to the battery as a charging mode a current interrupted at intervals of 1 millisecond to 9 seconds in a frequency range of about 0.1 to Hertz, said batteries being charged to a safe voltage limit.

2. Method according to claim 1 wherein the rechargeable lithium battery is a rechargeable lithium-molybdenum disulfide battery.

3. Method according to claim 2 wherein the interrupted current is applied at a frequency of about 5 Hertz at a duty cycle of 100 milliseconds pulse, 100 milliseconds rest.

4. Method according to claim 2 wherein the interrupted current is applied at a frequency of about 2 Hertz at a duty cycle of 250 milliseconds pulse, 250 milliseconds rest.

5. Method according to claim 2 wherein the interrupted current charging mode is superimposed on a constant potential that does not exceed the safe voltage limit for charging the battery.

6. Method according to claim 1 wherein the rechargeable lithium battery is a rechargeable lithium-titanium disulfide battery.

7. Method according to claim 6 wherein the interrupted current is applied at a frequency of about 5 Hertz at a duty cycle of 100 millimeters pulse, 100 milliseconds rest.

8. Method according to claim 6 wherein the interrupted current is applied at a frequency of about 2 Hertz at a duty cycle of 250 milliseconds pulse, 250 milliseconds rest.

9. Method according to claim 6 wherein the interrupted current charging mode is superimposed on a constant potential that does not exceed the safe voltage limit for charging the battery.

10. Method of significantly prolonging the cycle life of a rechargeable lithium-molybdenum disulfide battery comprising applying to the battery as a charging mode a current interrupted at intervals of 1 millisecond to 9 seconds in a frequency range of about 0.1 to about 10 Hertz wherein the interrupted current charging mode is superimposed on a DC current.

11. Method of significantly prolonging the cycle life of a rechargeable lithium-titanium disulfide battery comprising applying to the battery as a charging mode a current interrupted at intervals of 1 millisecond to 9 seconds in a frequency range of about 0.1 to about 10 Hertz wherein the interrupted current charging mode is superimposed on a DC current.

* * * * *

UNITED STATES PATENT AND TRADEMARK OFFICE
CERTIFICATE OF CORRECTION

PATENT NO. : 4,736,150

DATED : Apr. 5, 1988

INVENTOR(S) : OTTO C. WAGNER

It is certified that error appears in the above-identified patent and that said Letters Patent is hereby corrected as shown below:

Column 4, line 20, insert after "about 0.1 to" ---about 10---.

Signed and Sealed this

Sixteenth Day of April, 1996

Attest:

BRUCE LEHMAN

Attesting Officer     Commissioner of Patents and Trademarks